March 31, 1931.  G. E. A. HALLETT  1,798,938
HYDRAULIC SLACK ADJUSTER
Filed April 25, 1927  2 Sheets-Sheet 2
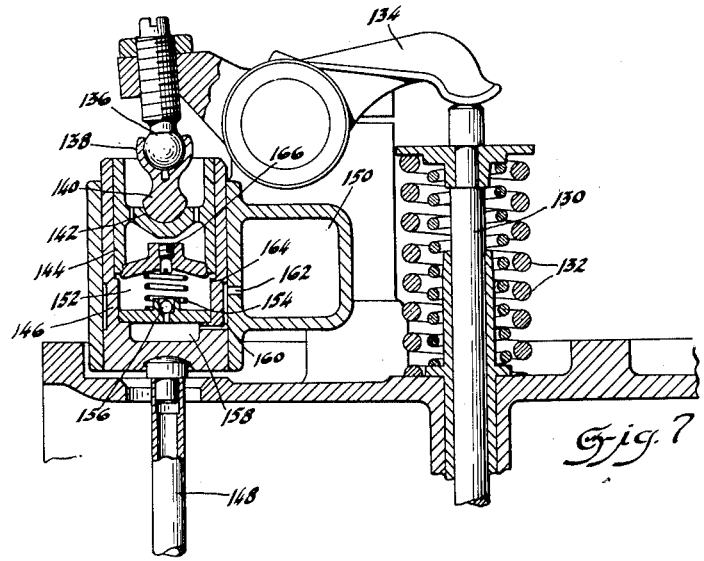
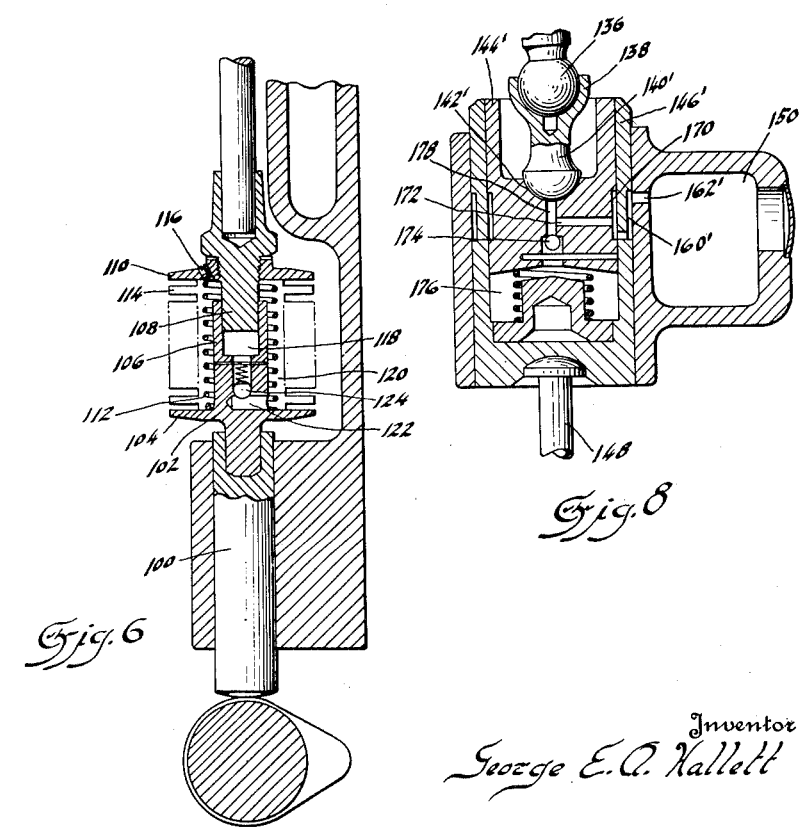
Inventor
George E. A. Hallett
By Blackmore, Spencer & Finch
Attorneys Patented Mar. 31, 1931

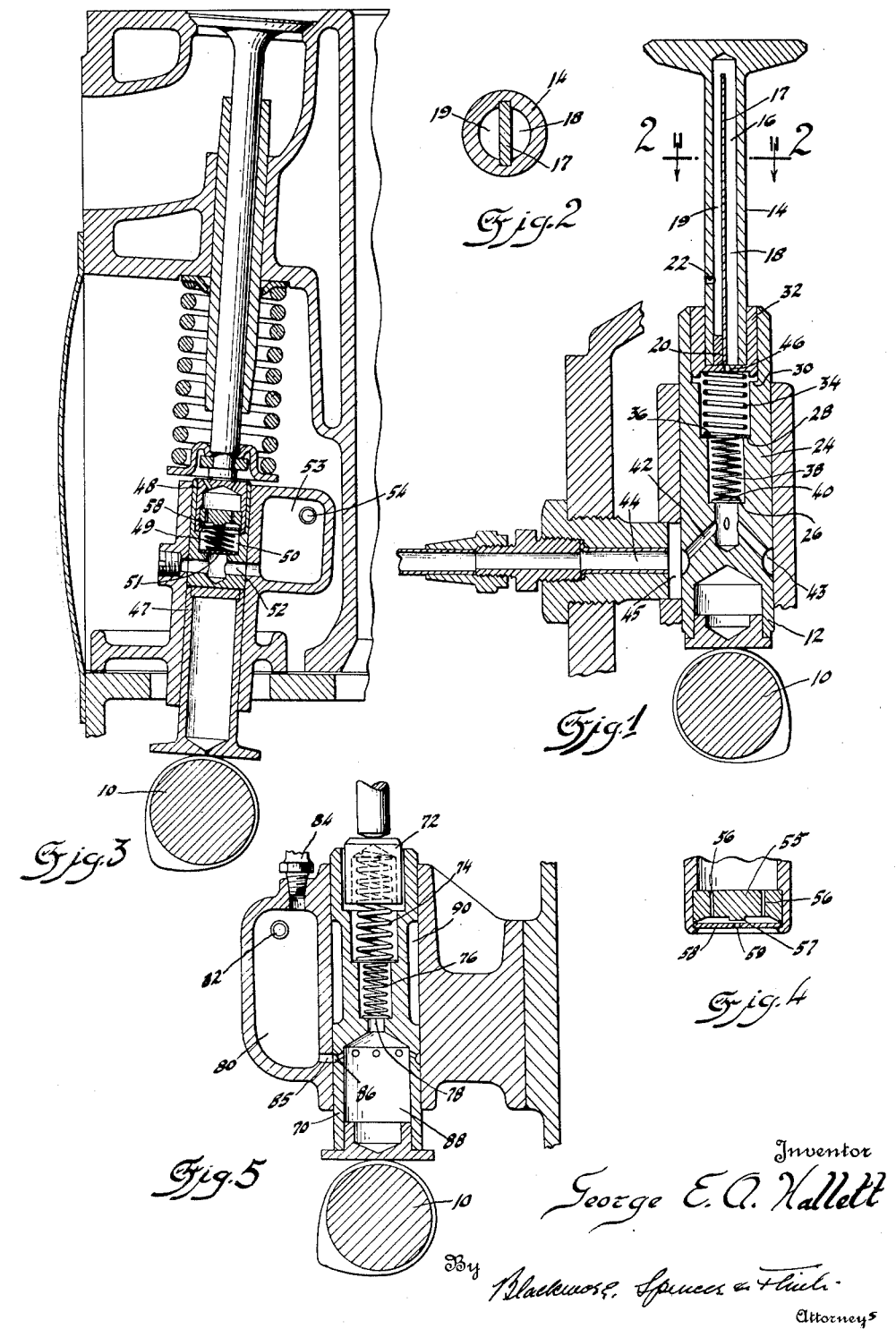

1,798,938

UNITED STATES PATENT OFFICE

GEORGE E. A. HALLETT, OF DETROIT, MICHIGAN, ASSIGNOR TO GENERAL MOTORS RESEARCH CORPORATION, OF DETROIT, MICHIGAN, A CORPORATION OF DELAWARE

HYDRAULIC SLACK ADJUSTER

Application filed April 25, 1927. Serial No. 186,447.

This invention relates to hydraulic valve mechanism of the so-called slack adjuster type; that is, the type in which one of the moving members of the valve gear, such as the push rod or valve stem, is formed of interfitting parts separated by an oil cushion. One of the parts may be in the form of a cylinder and the other in the form of a piston fitting in the cylinder, the piston resting upon a body of oil contained in the cylinder and the arrangement being such that additional oil is admitted to the cylinder to take up slack when the parts are cold and have, therefore, contracted, and oil is permitted to escape when the parts have expanded as a result of heating.

The operation of adding oil to take up slack should be automatic and this is usually accomplished by providing a spring between the parts so that when the valve gear contracts, the spring expands and separates the parts causing oil to be drawn into the cylinder from a suitable reservoir.

The simplest way of providing for the escape of oil upon the expansion of the parts is to permit leakage between the engaging surfaces of the piston and cylinder. To accomplish this, the piston may be made a rather sloppy fit in the cylinder or, if preferred a port or groove may be provided.

One feature of my invention consists in the provision of novel means for supplying oil to the reservoir from which the hydraulic chamber is supplied.

Another feature of my invention consists in the adaptation of slack adjusting mechanism of this type to overhead valves, the design being such as to reduce to a minimum the inertia of the parts which must be moved upon the expansion of the hydraulic chamber, thereby rendering it possible to employ lighter springs for the gear than could otherwise be used.

Another feature of my invention consists in an improved method of supplying oil to the chamber so as to provide against the admission of air thereto.

Slack adjusting devices of this type lend themselves very readily to the use of oil to cool the valves and one feature of my invention consists in so designing the valve gear as to effect cooling of the valves as well as eliminating slack.

According to one of the embodiments of my invention, the oil reservoir is in the form of an expansible chamber preferably constituted by a metallic bellows surrounding the hydraulic chamber.

Various other features of novelty will be hereinafter described and claimed.

Figure 1 is a diagrammatic view in section showing the application of my improved slack adjuster to an internal combustion engine of the L-head type and illustrating how valve cooling may readily be accomplished. Figure 2 is a section on line 2—2 of Figure 1. Figures 3, 5 and 6 show modified forms of my device as applied to L-head engines. Figure 4 is an enlarged view of the outlet valve of Figure 3. Figure 7 shows one method of applying my improved slack adjuster to overhead valves while Figure 8 is a fragmentary view showing a slight modification of the construction of Figure 7.

Referring now to Figures 1 and 2, 10 represents the usual cam shaft while 12 indicates generally the push rod in which my slack adjusting device is embodied. 14 indicates an engine valve arranged for oil cooling by boring the stem as at 16, broaching diametrically opposed grooves in the bore and fitting therein the metal partition 17 which stops short of the end of the bore. A U shaped cooling passage is thus formed in the valve stem. The passages constituting the legs of the U are indicated by reference characters 18 and 19. The lower end of passage 19 is closed by plug 20 and this passage is provided with port 22 for the discharge of the heated oil. The valve may be provided with a spring of any desired type to hold it upon its seat.

Push rod 12 comprises a cylinder 24 provided with communicating stepped bores separated by annular shoulders 26, 28 and 30. Within the uppermost bore is slidably fitted piston 32 normally urged upwardly by spring 34 resting on washer 36 seated on shoulder 28. The washer 36 provides a seat for the light spring 38 which normally retains check-valve 40 upon its seat. The lowermost bore is connected by passage 42, and annular groove 43 with chamber 45 and passage 44 which is connected on the output side of the usual engine oil pump. The groove 43 and the chamber 45 are of such relative widths as to be at all times in register. Piston 32 is provided with a restricted passage 46 establishing communication between the interior of the cylinder and the passage 18 in the valve stem.

Normally, the passages 42 and 43 are maintained full of oil under a slight degree of pressure. The restricted passage 46 permits a small quantity of oil to escape from the hydraulic chamber constituted by the portion of the cylinder between the check-valve 40 and the piston 32, into the passage 18 whence it finds its way to the head of the valve and thru passage 19 to the discharge port 22. The oil discharged thru this port is conducted back to the crankcase, preferably by following the openings provided about the valve tappet guides. The valve is thus maintained cool under all conditions of operation. The slight amount of oil escaping thru the passage 46 is replaced by oil from the passages 42 passing around the check valve 40, this refilling operation taking place during the interval when the tappet is not subjected to cam pressure. During this period the spring 34 tends to separate the piston and cylinder thereby creating a partial vacuum in the hydraulic chamber and drawing oil into the chamber past the check valve.

If the motor has been standing some little time, the valve parts become cool, contract, and play or lash develops between them. When the engine is started in this condition, valve operation will be somewhat noisy, whether the gear is of the hydraulic type or purely mechanical. Where my slack adjusting means is employed, the first few strokes of the valve mechanism will result in oil being drawn into the hydraulic chamber until the latter is filled to an extent to take up all lash. The gear will now operate very silently. Upon the parts becoming heated, the resulting expansion will cause the piston 32 to be forced downwardly into the cylinder 24 causing oil to escape from the hydraulic chamber, some thru the clearance between the piston and cylinder and some by increased flow thru the passage 46 into the bore 16 in the valve stem. This discharge will take place until the cushion is reduced to the proper volume.

By the means described, the hydraulic cushion is at all times maintained at the proper volume to take up lash in the gear, the adjustment of the cushion for the different stages of expansion and contraction of the parts being entirely automatic. The vent 46 thru which oil is conducted to the valves is preferably located, as shown, at the highest point in the hydraulic chamber so that it serves as a fixed leak to carry off air which may have collected in the chamber along with the oil stream.

Attention is called to the fact that should the supply of oil to the gear entirely fail, the engine will still be operable for the shoulder 30 will then make contact with the piston 32 and the operation will be simply that of noisy, poorly adjusted valve mechanism. This noise will serve as a warning to the driver of the car that the supply of oil is too low, that the passages leading to the gear or in the gear have become clogged, or that leaks have developed which render the cushion ineffective.

In the form shown in Figure 3, 47 indicates the cylinder, 48 the piston urged upwardly by spring 49 located in the hydraulic chamber 50. Spring 49 likewise serves to retain check valve 51 upon its seat, thus normally closing passage 52 leading from oil reservoir 53. This reservoir may extend the length of the engine and will serve to replenish the hydraulic cushions of any desired number of tappets. It is supplied with oil from the crankcase thru conduit 54 and may be provided with a pressure relief valve if desired. The clearance between piston and cylinder may be relied upon for the discharge of excess oil from the chamber. However, as best shown in Figure 4, the lower end of the piston is closed by a plug 55 perforated as at 56 off the center line and provided with valve seat 57. With this seat cooperates disk valve 59 having its edge securely clamped between plug 55 and the swaged over end of the piston. The valve has a central aperture 59 normally permitting escape of air but closed on the power transmitting stroke of the piston by being forced into engagement with seat 57. This valve is of the type disclosed and claimed in my prior application, Serial No. 161,361 filed January 15, 1927.

This form of my invention operates substantially the same as the first described form, the only differences being that an oil reservoir 53 is provided which, in the event of oil pump failure, will serve to supply the hydraulic cushion for some time; and that a special valve is provided for permitting the escape of excess oil.

In the form shown in Figure 5, 70 indicates the cylinder and 72 the piston, the latter being a sloppy fit in the cylinder. Spring 74 urges the piston 72 upwardly while light spring 76 holds check-valve 78 on its seat. The reservoir 80 is supplied with oil from the crankcase thru port 82 while conduit 84, which may be provided with a pressure relief valve, leads excess oil to the crankcase or to parts requiring lubrication. The reservoir 80 is provided with a port 85 adjacent its bottom which, during certain portions of the stroke of the tappet, registers with groove 86 provided in the tappet, the groove communicating with chamber 88 formed in the tappet, this chamber constituting a reservoir containing oil under pressure for replenishing the hydraulic chamber. The tappet may be cut away as at 90 to lighten the parts.

In both this form of the invention and the form shown in Figure 3, the oil supplied the tappet is taken from the lower portion of the reservoir so as to insure that only oil free from air will be admitted. In the form shown in Figure 5, the excess oil escapes thru the clearance provided between the piston 72 and cylinder 70. This form of the device operates in the same manner as the form shown in Figure 1.

Figure 6 shows a self-contained construction. In this case, the tappet 100 is provided with an enlargement shown in the form of a separate fitting 102 provided with flange 104 and with a cylinder portion 106 in which slides piston 108 provided with flange 110 corresponding to the flange 104. Coil spring 112 tends to separate the piston and cylinder. The bellows 114, which may be of the sylphon tube type, connects the flanges 104 and 110 and forms in conjunction with the flanges a reservoir 120. A screw plug 116 may be provided for admitting oil to the reservoir and may also serve as a vent for air. The hydraulic chamber designated at 118 communicates with the reservoir 120 thru passage 122 controlled by check valve 124. In this form of the device, the contraction of the parts upon cooling results in the distension of the chamber 118 in response to the action of spring 112 and oil is thereupon admitted to the chamber past the check valve 124 because of the partial vacuum created in the chamber. On the expansion of the parts, oil is forced out of the chamber thru the clearance provided between the piston and cylinder. The clearance between piston and the bottom of the cylinder may be made less than that shown so that this form, as well as the preceding, will operate satisfactorily, although noisily, when the device is empty of oil. This form of my invention will require the occasional addition of oil thru the plug 116.

Figures 7 and 8 show the application of my invention to overhead valves. While in this type of valve mechanism the slack adjuster could be located as shown in the preceding forms, this is undesirable for the reason that the spring operating to separate the piston and cylinder to draw oil into the hydraulic chamber must be made quite strong in order that it may overcome the inertia represented by the long push rod, the rocker and the valve stem. When this spring is increased in strength, the valve spring must be correspondingly increased so as to insure that the valve will follow the movements of the rocker. To avoid these difficulties, I have found it preferable to locate the slack adjuster near the rocker arms. While, in some cases, it may be desirable to provide such mechanism between the rocker arm and the valve stem, I prefer for convenience to illustrate mechanism at the upper end of the push rod. In Figure 7, 130 indicates one of the overhead valves held upon its seat by springs 132. The upper end of the valve stem is engaged by rocker 134, the other arm of which is provided with ball 136 fitting in socket 138 provided in link 140 having its lower end of spherical form and fitted in socket 142 in piston 144 sliding in cylinder 146, the lower end of which is engaged by push rod 148.

150 indicates a reservoir which may be supplied with oil from the crankcase as in the preceding forms and may extend along the engine so as to supply the several hydraulic chambers. This chamber may, as in the other forms, be provided with a suitable pressure relief valve. 152 indicates the hydraulic chamber and 154 the spring urging the piston 144 upwardly. The ball check valve 156 controls passages 158 formed in the cylinder and terminating in an annular groove 160 which is in constant communication with port 162 in the wall of the reservoir 150. As in the preceding forms, cylinder 146 is provided with a shoulder 164 serving as an emergency stop for the piston to permit engine operation should the system become empty of oil. The clearance between piston and cylinder may be relied upon for the discharge of excess oil or, if preferred, a fixed leak may be provided at 166 communicating with the exterior of the piston.

The form shown in Figure 8 is a slight variation of that shown in Figure 7, one difference being that the bore 162' is located in the upper portion of the reservoir 150 and communicates with annular groove 160' in the cylinder 146' which is, in turn, in communication with annular groove 170 provided in the piston 144'. 172 indicates a passage controlled by check-valve 174 leading from groove 170 to the hydraulic chamber 176. A passage 178 leads from the passages 172 to the seat 142' for the member 140'.

This arrangement operates the same as the form shown in Figure 7 except that the passage 172 provides a trap intercepting air and other light impurities before they have opportunity to enter the hydraulic chamber 176. The trapped gases escape past the engaging surfaces of link 140' and its socket 142'.

It is clear that my invention is susceptible of a great deal of modification as indicated by the different forms of the invention herein disclosed and by the broad terminology of the following claims.

The term "valve operating mechanism" as employed in the claims of this application includes within its scope all of the elements between the valve proper and the camshaft or equivalent part, including the valve stem for in some constructions the valve stem performs the function ordinarily performed by the push rod or tappet, and obviously, I am entitled to cover such obvious variations by the use of broad phraseology.

I claim:

1. The combination of a valve provided with a cooling passage, hydraulic mechanism including an hydraulic chamber for operating the valve and means for circulating fluid from said chamber through the passage for cooling the valve.

2. In the combination as defined in claim 1, said means comprising a vent leading from the highest point in said chamber.

3. The combination of a valve provided with a cooling passage, a push rod for operating the valve including cooperating reciprocating parts, an hydraulic chamber between said parts, means for supplying fluid to said chamber to take up slack in said system, and means for conducting a portion of the fluid from said chamber to said cooling passage to effect cooling of the valve.

4. The combination of a valve provided with a cooling passage, operating means therefor comprising an operating part and an operated part separated by a hydraulic chamber, means for supplying oil to said chamber to take up slack in the system, one of said parts being apertured to admit oil from the chamber to said cooling passage.

5. The combination of a valve provided with a cooling passage, operating means therefor comprising an operating part and an operated part, hydraulic means for taking up slack between said parts, said operated part directly engaging the valve stem to operate the valve, means for supplying oil to said hydraulic means to take up slack in the system, said operated part being apertured to admit oil from the said hydraulic means to said cooling passage, the contacting surfaces of the valve stem and the operated part being substantially in the line of flow of the oil from the hydraulic means to the valve so as to provide an oil film therebetween for cushioning their contact.

In testimony whereof, I affix my signature.

GEORGE E. A. HALLETT.